US012135736B2

(12) United States Patent
Patil et al.

(10) Patent No.: US 12,135,736 B2
(45) Date of Patent: Nov. 5, 2024

(54) AUTOMATED SYSTEMS AND METHODS FOR GENERATING TECHNICAL QUESTIONS FROM TECHNICAL DOCUMENTS

(71) Applicant: Tata Consultancy Services Limited, Mumbai (IN)

(72) Inventors: Sangameshwar Suryakant Patil, Pune (IN); Samiran Pal, Kolkata (IN); Avinash Kumar Singh, Kolkata (IN); Soham Datta, Kolkata (IN); Girish Keshav Palshikar, Pune (IN); Indrajit Bhattacharya, Kolkata (IN); Harsimran Bedi, Pune (IN); Yash Agrawal, Hyderabad (IN); Vasudeva Varma Kalidindi, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 251 days.

(21) Appl. No.: 17/822,714

(22) Filed: Aug. 26, 2022

(65) Prior Publication Data

US 2023/0061773 A1 Mar. 2, 2023

(30) Foreign Application Priority Data

Sep. 2, 2021 (IN) .............................. 202121039771

(51) Int. Cl.
*G06F 40/00* (2020.01)
*G06F 16/332* (2019.01)
(Continued)

(52) U.S. Cl.
CPC .......... *G06F 16/3329* (2019.01); *G06F 16/35* (2019.01); *G06F 40/295* (2020.01);
(Continued)

(58) Field of Classification Search
CPC ...... G06F 40/30; G06F 40/211; G06F 40/268; G06F 40/253; G06F 40/284;
(Continued)

(56) References Cited

U.S. PATENT DOCUMENTS

| 10,614,106 B2 | 4/2020 | Kelsey et al. |
| 11,023,684 B1 | 6/2021 | Flor et al. |
| 11,080,598 B2 | 8/2021 | Kotri et al. |

FOREIGN PATENT DOCUMENTS

IN 201621002124 A 1/2016

*Primary Examiner* — Vu B Hang

(74) *Attorney, Agent, or Firm* — FINNEGAN, HENDERSON, FARABOW, GARRETT & DUNNER, LLP

(57) ABSTRACT

Questions play a central role in assessment of a candidate's expertise during an interview or examination. However, generating such questions from input text documents manually needs specialized expertise and experience. Further, techniques that are available for automated question generation require input sentence as well as an answer phrase in that sentence to generate question. This in-turn requires large training datasets consisting tuples of input sentence answer-phrase and the corresponding question. Additionally, training datasets are available are for general purpose text, but not for technical text. Present application provides systems and methods for generating technical questions from technical documents. The system extracts meta information and linguistic information of text data present in technical documents. The system then identifies relationships that exist in provided text data. The system further creates one or more graphs based on the identified relationships. The created graphs are the used by the system to generate technical questions.

20 Claims, 11 Drawing Sheets

(51) Int. Cl.
  *G06F 16/35* (2019.01)
  *G06F 40/295* (2020.01)
  *G06F 40/30* (2020.01)
  *G10L 15/18* (2013.01)
  *G10L 15/183* (2013.01)
  *G10L 15/22* (2006.01)

(52) U.S. Cl.
  CPC .......... *G06F 40/30* (2020.01); *G10L 15/1822* (2013.01); *G10L 15/183* (2013.01); *G10L 15/22* (2013.01)

(58) Field of Classification Search
  CPC ..... G06F 40/242; G06F 40/247; G10L 15/07; G10L 15/20; G10L 15/22; G10L 15/26; G10L 15/30; G10L 15/02; G10L 15/063; G10L 15/08; G10L 15/1822; G10L 15/183; G10L 15/193; G10L 15/19; G10L 15/16; G10L 25/27; G10L 25/30; G10L 19/005; G10L 19/00
  See application file for complete search history.

```
(Sample Table of Contents)
1. Definition
2. Algorithms
    2.1  Connectivity-based clustering (hierarchical
    clustering)
    2.2  Centroid-based clustering
    2.3  Distribution-based clustering
    2.4  Density-based clustering
    2.5  Grid-based clustering
    2.6  Recent developments
3. Evaluation and assessment
    3.1  Internal evaluation
    3.2  External evaluation
    3.3  Cluster tendency
4. Applications
    4.1  Biology, computational biology and bioinformatics
    4.2  Medicine
    4.3  Business and marketing
    4.4  World wide web
    4.5  Computer science
    4.6  Social science
```

FIG. 5A

```
BL := {way,ways,method,methods,approach,approaches};

for each sentence S in a received document P do:

a.  if S does not contain string "to V" where V is a verb in simple
        present tense then continue; endif
    b.  if there is no "aux" Dependency Relation (DR) in ULDG between
        "to" and V then continue; endif
    c.  if V is NOT an "action" verb then continue; endif
    d.  Let X := direct object phrase of V // headword of X, V related by dobj
        or obj DR
    e.  if there is no such X then continue; endif
    f.  Let X1 be the phrase obtained by adding to X at most 3 consecutive
        prepositional phrases (PP) occurring after X but without crossing
        comma or colon, semicolon, a verb (unless it is inside a PP);
    g.  if X1 contains any pronoun or any coreference marker word then
        continue; endif
    h.  if X1 contains any verb which is not inside a PP then continue; endif
    i.  Let U be a verb connected to V using "xcomp" or "advcl" DR;
    j.  if there is no such U then print "How can you V X1?"; continue;
        endif
    k.  Let SUB := subject of U; // SUB is connected to U using "nsubj" or
        "nsubjpass" DRs
    l.  if U does not have any subject then S_empty := true
        else S_empty := false; endif a.  if !S_empty and (SUB contains a pronoun or SUB contains a
        coreference marker word or SUB contains a word in BL) then S_bad
        := true else S_bad := false; endif
    b.  Let U1 := root form of U;
    c.  if !S_empty and !S_bad then
        if U1 is not an action verb then print "How do/can SUB V X1?" else
        continue; endif a.  else
        if U1 is an action verb then print "How do you U1 to V X1?";

else print "How do you V X1?" endif a.  endif
end for
```

FIG. 10A

*WL* := {*advantage, advantages, benefit, benefits, disadvantage, disadvantages, risk, risks*};

for each sentence *S* in a received document *P* do:

a.  if *S* does not contain a word from *WL* then continue; endif
    b.  Let *X* be the word from *WL* that occurs in *S* with POS tag "noun";
    c.  if *X* is the headword of an entire phrase *O* connected to a copula verb *V* by Dependency Relation (DR) in ULDG "dobj" and *O* is connected by DR "prep" to preposition "over" and this "over" is connected to an entire phrase *M* using DR "pobj" and *V* is connected by DR "nsubj" to an entire phrase *Y* the
        i.  if *Y* contains any pronoun or any coreference marker then continue; endif
        ii.  Let *N* be the above prepositional phrase (PP) headed by "of" // N := "of" + Y
        iii.  Let *Z* be the plural of *X*; // advantage → advantages, risk → risks etc.
        iv.  print "Describe the *Z* of N over M."
    d.  else if *X* is connected by DR "prep" to the preposition "of" and this "of" is connected to an entire phrase *Y* using DR "pobj" then
        i.  if *Y* contains any pronoun or any coreference marker then continue; endif
        ii.  Let *N* be the above PP headed by "of" // N := "of" + Y
        iii.  Let *Z* be the plural of *X*; // advantage → advantages, risk → risks etc.

FIG. 10B

AUTOMATED SYSTEMS AND METHODS FOR GENERATING TECHNICAL QUESTIONS FROM TECHNICAL DOCUMENTS

PRIORITY CLAIM

This U.S. patent application claims priority under 35 U.S.C. § 119 to: Indian provisional application no. 202121039771, filed on Sep. 2, 2021. The entire contents of the aforementioned application are incorporated herein by reference.

TECHNICAL FIELD

The disclosure herein generally relates to question generation, and, more particularly, to systems and methods for generating technical questions from technical documents.

BACKGROUND

Technical question generation is an important class of problem in which the technical questions are to be generated from technical text. Some important applications of the technical question generation include creation of question-banks for examinations and interviews, intelligent tutoring systems etc.

Mostly, the available techniques for automated question generation are dominated by deep learning (DL). The DL-based approaches require an input sentence as well as an answer phrase in that sentence to generate a question. This in-turn requires a large training dataset consisting tuples of input sentences, the answer-phrases, and the corresponding questions. Further, the existing DL-based techniques are more focused towards generating questions from general purpose text by making use of existing general-purpose datasets, such as SQUAD (the Stanford Question Answer Dataset) to train the DL models. However, there are neither readily available techniques that focus on generating questions from technical text nor the datasets.

In existing approaches, questions whose answers span only a few words are generated. Further, the existing approaches lay more emphasis on the named entities such as person, organization, location etc., to generate 'who', 'where', or 'when' type of questions for which the named entities are the expected answers. Generation of questions based on named entities makes no sense in case of technical domain as what is being described in technical text is more important than who has invented and when it was invented. In addition, the traditional approaches lack the ability to generate questions with 'No' as an answer to 'Yes/No' type of questions.

SUMMARY

Embodiments of the present disclosure present technological improvements as solutions to one or more of the above-mentioned technical problems recognized by the inventors in conventional systems. For example, in one aspect, there is provided a processor implemented method for generating technical questions from technical documents. The method comprises receiving, by an technical question generation system (TQGS) via one or more hardware processors, (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain; extracting, by the TQGS via one or more hardware processors, structure information from the one or more technical documents to create a document structure graph (DSG); creating, by the TQGS via the one or more hardware processors, a unified linguistic denotation graph (ULDG) from the one or more technical documents using one or more natural language processing algorithms; identifying, by the TQGS via the one or more hardware processors, one or more domain specific technical terms using a keyword extraction algorithm and a domain specific term clustering algorithm based at least in part on the one or more non-domain specific technical terms and the one or more seed terms; identifying, by the TQGS via the one or more hardware processors, a plurality of relationships, relation types and attributes of relations associated between the one or more domain specific technical terms present in the one or more technical documents using one or more open information extraction algorithms and one or more semantic role labelling algorithms to obtain additional information corresponding to the technical domain; creating, by the TQGS via the one or more hardware processors, a concept graph (CG) by populating a concept graph data structure using the identified one or more domain specific technical terms and the additional information obtained corresponding to the technical domain; identifying, by the TQGS via the one or more hardware processors, one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generating, by the TQGS via the one or more hardware processors, one or more technical questions based on the one or more graph motifs and the one or more graphs using a plurality of semantic templates.

In another aspect, there is provided a technical question generation system (TQGS) for generating technical questions from technical documents. The system comprises a memory storing instructions; one or more communication interfaces; and one or more hardware processors coupled to the memory via the one or more communication interfaces, wherein the one or more hardware processors are configured by the instructions to: receive (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain; extract structure information from the one or more technical documents to create a document structure graph (DSG); create a unified linguistic denotation graph (ULDG) from the one or more technical documents using one or more natural language processing algorithms; identify one or more domain specific technical terms using a keyword extraction algorithm and a domain specific term clustering algorithm based at least in part on the one or more non-domain specific technical terms and the one or more seed terms; identify a plurality of relationships, relation types and attributes of relations associated between the one or more domain specific technical terms present in the one or more technical documents using one or more open information extraction algorithms and one or more semantic role labelling algorithms to obtain additional information corresponding to the technical domain; create a concept graph (CG) by populating a concept graph data structure using the identified one or more domain specific technical terms and the additional information obtained corresponding to the technical domain; identify one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generate one or more technical questions based on the one or more graph motifs and the one or more graphs using a plurality of semantic templates.

In yet another aspect, there are provided one or more non-transitory machine-readable information storage mediums comprising one or more instructions which when executed by one or more hardware processors cause a method for extracting, digitizing, and using engineering drawing data. The method comprises receiving, by an technical question generation system (TQGS) via one or more hardware processors, (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain; extracting, by the TQGS via one or more hardware processors, structure information from the one or more technical documents to create a document structure graph (DSG); creating, by the TQGS via the one or more hardware processors, a unified linguistic denotation graph (ULDG) from the one or more technical documents using one or more natural language processing algorithms; identifying, by the TQGS via the one or more hardware processors, one or more domain specific technical terms using a keyword extraction algorithm and a domain specific term clustering algorithm based at least in part on the one or more non-domain specific technical terms and the one or more seed terms; identifying, by the TQGS via the one or more hardware processors, a plurality of relationships, relation types and attributes of relations associated between the one or more domain specific technical terms present in the one or more technical documents using one or more open information extraction algorithms and one or more semantic role labelling algorithms to obtain additional information corresponding to the technical domain; creating, by the TQGS via the one or more hardware processors, a concept graph (CG) by populating a concept graph data structure using the identified one or more domain specific technical terms and the additional information obtained corresponding to the technical domain; identifying, by the TQGS via the one or more hardware processors, one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generating, by the TQGS via the one or more hardware processors, one or more technical questions based on the one or more graph motifs and the one or more graphs using a plurality of semantic templates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A illustrates an example representation of structure information extracted from technical documents, in accordance with an embodiment of the present disclosure.

FIGS. 10A and 10B illustrate example representations of semantic templates used for technical question generation by the system of FIG. 2 or the TQGS of FIG. 1, in accordance with an embodiment of the present disclosure.

DETAILED DESCRIPTION

Figure 1:
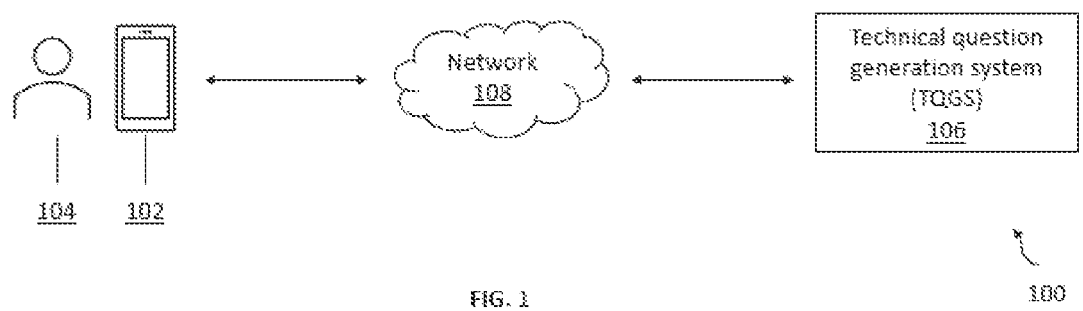
FIG. 1 is an example representation of an environment depicting a technical question generation system (TQGS) for generating technical questions from technical documents, in accordance with at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Questions play a central/critical role in assessment of a candidate's expertise during an interview or examination. However, generating such questions from input text documents manually needs specialized expertise and experience. Further, the techniques that are available for automated question generation require an input sentence as well as an answer phrase in that sentence to generate a question. This in-turn requires large training datasets consisting of tuples of input sentence the answer-phrase and the corresponding question. Additionally, the training datasets that are available are for general purpose text, but not for technical text. Few other limitations of the existing techniques include generation of questions whose answers span only a few words, high reliability on named entities and generation of questions that makes no sense in technical domain. Embodiments of the present disclosure overcome this disadvantage by providing a technical question generation system that ensures answer un-aware question generation and improves the correctness of generated question. More specifically, meta information and linguistic information is used by the systems and methods of the present disclosure instead of named entities for question generation. Further, multiple graphs are created using domain specific keywords for extracting additional information associated with the technical domain. This improves the correctness of the generated technical questions.

Referring now to the drawings, and more particularly to FIGS. 1 through 11B, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, technical question generation, fine-tuning pre-existing machine learning models, etc. The environment 100 generally includes a device, such as a user device 102, and a technical question generation system (hereinafter referred as 'TAGS') 106, each coupled to, and in communication with (and/or with access to) a network 108. It should be noted that one user device is shown for the sake of explanation; there can be more than one user device.

The network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols or beyond 5G, Long Term Evolution (LTE) communication protocols, or any combination thereof.

The user device 102 is shown to be associated with a user 104 (e.g., a user or an entity such as an organization) who wants to generate technical questions from technical documents using the TQGS 106. Examples of the user device 102 include, but are not limited to, a personal computer (PC), a mobile phone, a tablet device, a Personal Digital Assistant (PDA), a voice activated assistant, a smartphone, and a laptop.

The technical question generation system (TQGS) 106 includes one or more hardware processors and a memory. The TQGS 106 is configured to perform one or more of the operations described herein. The TQGS 106 is configured to receive one or more technical documents via the network 108 from the user device 102 of the user 104 who wants to generate technical questions related with a technical domain by performing linguistic operations on the technical documents. In an embodiment, the user device 102 and the TQGS 106 may be the same device. In such scenarios, the technical documents may be received/fetched by the TQGS 106 from one more repository(ies) comprised therein or fetched from a cloud, in one example embodiment. In general, the TQGS 106, for generating technical questions, identifies concepts and relation between the concepts explained in the technical documents and creates one or more graphs based on the identified concepts and relation between concepts. The created graphs are then further utilized by the TQGS 106 to generate technical questions using semantic templates. In a more illustrative manner, the TQGS 106 first performs pre-processing on the technical documents to remove sentences from which questions are not needed from text provided in the technical documents. Further, the TQGS 106 creates one or more graphs based on the information provided in the technical documents. The created one or more graphs includes a document structure graph (DSG), unified linguistic denotation graph (ULDG) and a concept graph (CG). Once the graphs are created, the TQGS 106 identifies one or more graph motifs in the graphs using linguistic information associated with graph elements of the corresponding graphs. Thereafter, the TQGS 106 generates one or more technical questions based on the graph motifs and the graphs using a plurality of semantic templates. The generated technical questions are then stored and displayed to the user 104 on the user device 102.

In one embodiment, the TQGS 106 is configured to receive the technical documents along with a name of the technical domain, one or more non-domain specific technical terms and one or more seed terms associated with the technical domain, and a knowledge graph (KG) specific to the technical domain via the network 108 from the user device 102 associated with the user 104 who wants to create technical questions based on technical text included in the technical documents. In another embodiment, the technical documents, the name of the technical domain, non-domain specific technical terms, seed terms, and the KG may be received from the user device 102 locally without the use of any network/internet—such scenarios can be realized when the TQGS 106 is implemented within the user device 102 as mentioned above. It is to be understood by a person having ordinary skill in the art or person skilled in the art that such scenarios as described herein shall not be construed as limiting the scope of the present disclosure.

The TQGS 106 utilizes one or more natural language processing algorithms (e.g., natural language processing algorithm(s) as known in the art) for performing sentence filtering on the technical documents and for creating the ULDG. The TQGS 106 also utilizes a keyword extraction algorithm and domain specific term clustering algorithm for identifying one or more domain specific technical terms that are further utilized to create the CG. Further, TQGS 106 utilizes one or more open information extraction algorithms and one or more semantic role labelling algorithms to identify relationships, relation types and attributes of relations associated between the one or more domain specific technical terms. Additionally, a trained classifier (also referred as pre-trained classifier—such as binary classifier that include Random Forest, Support Vector Machine and the like) is utilized by the TQGS 106 for classifying each generated technical question of the one or more technical questions either as an acceptable technical question or an unacceptable technical question.

In an embodiment, the TQGS 106 can use the acceptable technical questions for fine-tuning one or more pre-existing machine learning models and one or more pre-existing deep learning models (not shown in FIG. 1) for question generation that are connected to the TQGS using the network 108.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
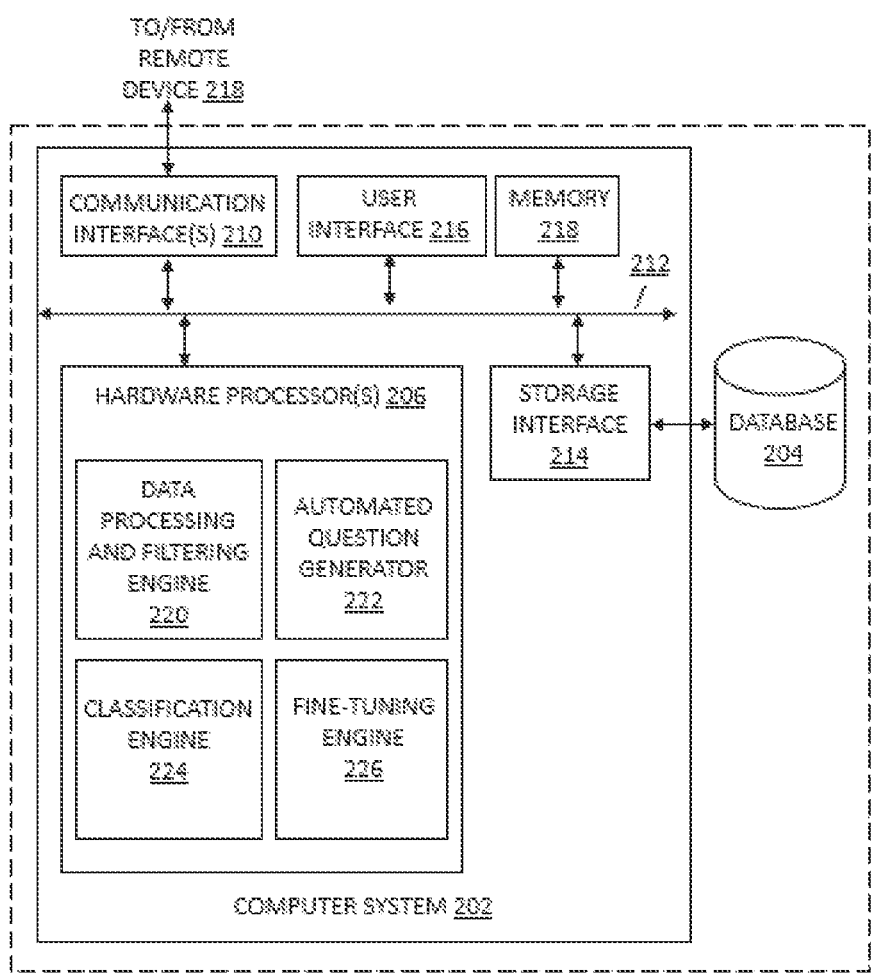
FIG. 2 illustrates an exemplary block diagram of a technical question generation system (TQGS) for generating technical questions from technical documents, in accordance with an embodiment of the present disclosure.

FIG. 2 illustrates an exemplary block diagram of a technical question generation system (TQGS) 200 for generating technical questions from technical documents, in accordance with an embodiment of the present disclosure. In an embodiment, the technical question generation system (TQGS) may also be referred as system and may be interchangeably used herein. The system 200 is similar to the TQGS 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

The TQGS 200 includes a computer system 202 and a database 204. The computer system 202 includes one or more processors 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the one or more processors 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the one or more processors 206 with access to the database 204.

In one embodiment, the database 204 is configured to store a list of acceptable technical questions generated for the received one or more technical documents.

The one or more processors 206 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 208.

The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the TQGS 200, as described herein. In another embodiment, the memory 208 may be realized in the form of a database server or a cloud storage working in conjunction with the TQGS 200, without departing from the scope of the present disclosure.

The one or more processors 206 are operatively coupled to the communication interface 210 such that the one or more processors 206 are capable of communicating with a remote device 218 such as, the user device 102, or communicated with any entity (for e.g., a machine learning/deep learning model) connected to the network 108. Further, the one or more processors 206 are operatively coupled to the user interface 216 for interacting with users, such as the user 104 who wants to generate technical questions for one or more technical documents associated with a technical domain.

It is noted that the TQGS 200 as illustrated and hereinafter described is merely illustrative of an apparatus that could benefit from embodiments of the present disclosure and, therefore, should not be taken to limit the scope of the present disclosure. It is noted that the TQGS 200 may include fewer or more components than those depicted in FIG. 2.

In one embodiment, the one or more processors 206 includes a data pre-processing and filtering engine 220, an automated question generator 222, a classification engine 224 and a fine-tuning engine 226.

The data pre-processing and filtering engine 220 includes suitable logic and/or interfaces for receiving one or more technical documents associated with a technical domain, a name of the technical domain, one or more non-domain specific technical terms and one or more seed terms associated with the technical domain, and a knowledge graph (KG) specific to the technical domain from a user device (e.g., the user device 104). In one embodiment, the data pre-processing and filtering engine 220 is configured to identify one or more named entities and one or more time expressions present in the technical documents by assigning a named entity tag to each named entity and a time expression tag to each time expression using one or more natural language processing algorithms. As sentences marked with named entities and date-time expressions are not of much use in case of question generation focused on a technical domain, these sentences can be ignored. So, once the named entities and the time expressions present in the technical documents are identified, the data pre-processing and filtering engine 220 performs sentence filtering on the technical documents by removing the sentences containing named entities and the time expressions to obtain a filtered set of technical documents. In an embodiment, the data pre-processing and filtering engine 220 may also store the sentences containing named entities and the time expressions tags for identifying acceptable questions at the time of classification.

In one example, suppose the technical documents received includes the text "Cluster analysis was originated in anthropology by Driver and Kroeber in 1932 and introduced to psychology by Joseph Zubin in 1938 and Robert Tryon in 1939 and famously used by Cattell beginning in 1943 for trait theory classification in personality psychology". So, the sentences that contain named entities (e.g., Driver, Kroeber, Joseph Zubin etc.) as well as expressions indicating date-time (e.g., 1932, 1938 etc.) are identified and filtered by the data pre-processing and filtering engine 220.

The automated question generator 222 is in communication with the data pre-processing and filtering engine 220. The automated question generator 222 is configured to automatically generate one or more technical questions from the received technical documents. In one embodiment, automated question generator 222 may use the filtered set of technical documents provided by the data pre-processing and filtering engine 220 for generating technical questions. The generated technical questions are generally answer un-aware questions and includes at least one of one or more descriptive type technical questions and one or more yes-no type technical questions. The working of the automated question generator 222 is explained in detail with reference to FIG. 3.

The classification engine 224 includes suitable logic and/or interfaces for classifying each technical question of the one or more technical questions generated by the automated question generator 222 either as an acceptable technical question or an unacceptable technical question using a trained question classifier. In one non-limiting example, the trained question classifier includes, but are not limited to, neural network-based algorithms, such as a multi-layer feed-forward neural network algorithm, a recurrent neural network algorithm, etc. In an embodiment, the classification engine 224 may also use the sentences containing named entities and the time expressions tags for performing the classification. In general, "Classification" refers to a predictive modeling problem where a class label is predicted for a given example of the input sequence. In particular, the classification engine 224 is configured to generate and store a list of acceptable technical questions in the database 204 based on the classification.

In an embodiment, the trained question classifier is trained based on a plurality of criteria for performing the classification. The plurality of criteria includes (i) Sentence-level embeddings of text of a generated technical question, a source sentence, and a potential set of focus words corresponding to the generated technical question in the sentence, (ii) Number of words in the generated technical question, the source sentence and the potential set of focus words, (iii) ratio of length of the potential set of focus words to sentence length, (iv) information from the dependency parse trees such as number of edges, number of hops between subject and verb, in-degree and out-degree of the nodes, (v) named entities and the time expressions tags, and (vi) type of technical question.

The fine-tuning engine 226 includes suitable logic and/or interfaces for fine-tuning the one or more pre-existing machine learning models and one or more pre-existing deep learning models that are available for question generation using the list of acceptable questions.

In one embodiment, the user interface 216 is configured to display the list of acceptable technical questions to the user 104 on the user device 102.

Figure 3:
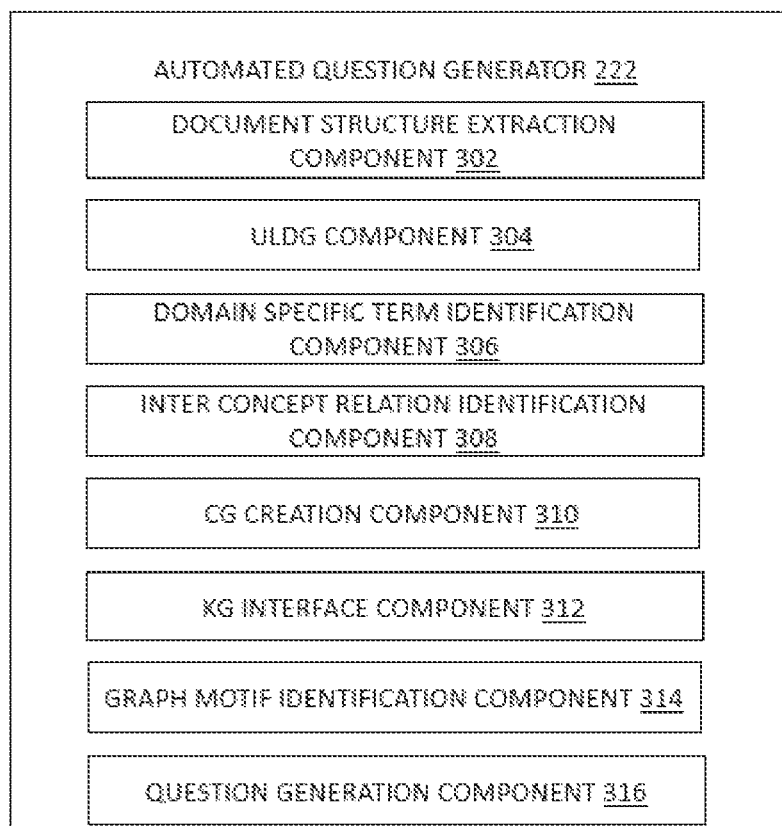
FIG. 3 illustrates a schematic block diagram representation of an automated question generator associated with a system of FIG. 2 or the TQGS of FIG. 1 for generating technical questions from technical documents, in accordance with an embodiment of the present disclosure.

FIG. 3, with reference to FIGS. 1 and 2, illustrates a schematic block diagram representation 300 of the automated question generator 222 associated with the system 200 of FIG. 2 or the TQGS of FIG. 1 for generating technical questions from technical documents, in accordance with an embodiment of the present disclosure. In an embodiment, the automated question generator 222 includes a document structure extraction component 302, a ULDG component 304, a domain specific term identification component 306, an inter concept relation identification component 308, a CG creation component 310, a KG interface component 312, a graph motif identification component 314 and a question generation component 316.

The document structure extraction component 302 includes suitable logic and/or interfaces for extracting structure information of the received one or more technical documents. The structure information includes at least one of table of contents, titles of sections, subsections, hyperlinks, and text portions with special mark-up provided in the technical documents. In an embodiment, the document structure extraction component 302 is also configured to create a document structure graph (DSG) using the extracted structure information. An example of the extracted structure information and the document structure graph created corresponding to the structure information is shown and explained with reference to FIGS. 5A and 5B, respectively.

The ULDG component 304 includes suitable logic and/or interfaces for extracting linguistic information associated with the text data present in the one or more technical documents and creating a unified linguistic denotation graph (ULDG) by populating the extracted linguistic information. In particular, for creating the ULDG, the ULDG component 304 first assigns part-of-speech (POS) tags and lemmas to each word present in the filtered set of technical documents using the one or more natural language processing algorithms. The ULDG component 304 then generates a dependency parse tree and a constituency parse tree for each sentence present in the filtered set of technical documents using the one or more natural language processing algorithms. Thereafter, the ULDG component 304 marks one or more co-references present in the filtered set of technical documents using the one or more natural language processing algorithms. The part-of-speech (POS) tags, the lemmas, the dependency parse trees, the constituency parse trees, and the one or more co-references are further identified as linguistic information associated with the text data provided in the one or more technical documents. Once the linguistic information associated with the text data is available, the ULDG component 304 creates the ULDG based on the identified linguistic information.

The domain specific concept identification component 306 includes suitable logic and/or interfaces for identifying one or more concepts, i.e., one or more technical terms and one or more keywords denoting different notions in the text data and for selecting one or more domain specific technical terms that are related to a technical domain of the text data from the identified technical terms and keywords based at least in part on the received one or more non-domain specific technical terms and the one or more seed terms using a keyword extraction algorithm and a domain specific term clustering algorithm. In particular, the one or more domain specific technical terms are selected by filtering out irrelevant terms based on the non-domain specific technical terms and seed terms using the domain specific term clustering algorithm that performs clustering. In an embodiment, "Clustering" generally refers to a process of grouping a set of data or objects (e.g., logs, etc.) into a set of meaningful subclasses called "clusters". Clustering generally is a form of data mining or data discovery used in unsupervised machine learning of unlabeled data. In one non-limiting example, the domain specific term clustering algorithm includes, but not limited to, hierarchical clustering, K-means algorithm, kernel-based clustering algorithms, density-based clustering algorithms, spectral clustering algorithms, etc.

In an embodiment, the domain specific term identification component 306 extracts one or more technical terms from the text data present in the filtered set of technical documents based on the technical domain using the keyword extraction algorithm. Examples of the keyword extraction algorithm that can be used includes sCAKE, SGRank, etc. The domain specific term identification component 306 then extracts one or more keywords present in at least one of indices, table of contents, anchor text of hyperlinks and title of hyperlinks present in the filtered set of technical documents. Thereafter, the domain specific term identification component 306 extracts one or more noun phrases present in the filtered set of technical documents. Further, the extracted one or more technical terms, the one or more keywords and the one or more noun phrases are identified as one or more candidate domain specific technical terms by the domain specific concept identification component 306.

Once the candidate domain specific technical terms are identified, the domain specific term identification component 306 segregates the one or more domain specific technical terms in the filtered set of technical documents based on the identified one or more candidate domain specific technical terms and the received one or more non-domain specific technical terms and the one or more seed terms using the domain specific term clustering algorithm. In particular, the one or more extracted technical terms and the one or more keywords that are denoted by the one or more noun phrases are identified as the one or more domain specific technical terms. Thereafter, the domain specific term clustering algorithm segregates the domain specific technical terms denoted by noun phrases from the non-domain specific technical terms.

In one example, consider the noun phrases from a Wikipedia® page of 'Cluster Analysis'. The domain-specific term identification component 306 makes use of all the steps mentioned above and identifies 'complete linkage clustering', 'average linkage clustering' as domain-specific technical terms for the technical document 'Cluster Analysis' in Machine Learning.

The inter concept relation identification component 308 includes suitable logic and/or interfaces for identifying a plurality of relationships, relation types and attributes of relations associated between the one or more domain specific technical terms present in the one or more technical documents using one or more open information extraction algorithms and one or more semantic role labelling algorithms to obtain additional information corresponding to the technical domain.

In an embodiment, the inter concept relation identification component 308 accesses a phrase structure of words available for each domain specific technical term of the one or more domain specific technical terms. The phrase structure of words for each domain specific technical term is created based on a dependency parse tree that is created for the respective domain specific technical term by the ULDG component 304. The inter concept relation identification component 308 also accesses one or more words that are in vicinity of the one or more domain specific technical terms present in the one or more technical documents. The inter concept relation identification component 308 then identifies is-a-subtype-of relationships among words of one or more domain specific technical terms based on the phrase structure of the respective one or more domain specific technical terms. In particular, the phase structure is used to identify a headword of a phrase as the headword does not have an incoming edge from the words inside the phrase. Further, an incoming dependency parse edge for the headword of the phrase will be from a word/token outside the phrase thus leading to identification of the headword and subsequently, is-a-subtype-of relationships among the headwords based on similarity among the headwords. For example, with reference to above mentioned example, the inter concept relation identification component 308 may identify 'complete linkage clustering' and 'average linkage clustering' as subtypes of the 'clustering' concept because of the presence of the identified headword 'clustering'.

Thereafter, the inter concept relation identification component 308 identifies hypernymy-hyponymy relationships among the one or more domain specific technical terms based on the one or more words that are in vicinity of the respective one or more domain specific technical terms and phrase structures of the respective one or more domain specific technical terms. In an embodiment, Hearst patterns are used by the inter concept relation identification component 308 to identify the hypernymy-hyponymy relationships among the one or more domain specific technical terms. For example, consider a text 'statistical distribution, such as multivariate normal distribution' is present in a received technical document. And the term 'statistical distribution' is identified as a domain specific technical term for the received technical document. So, the words 'multivariate normal distribution' and 'such as' are considered as the words present in the vicinity of the domain specific technical term and the same words will be considered for identifying hypernymy-hyponymy relationship. For the current example, the hypernymy-hyponymy relationship that is identified by the inter concept relation identification component 308 is 'multivariate normal distribution' as hyponym and 'statistical distribution' as hypernym.

Further, the inter concept relation identification component 308 identifies one or more hypernyms for each domain specific technical term of the one or more domain specific technical terms using a lexical database, such as Wordnet. The inter concept relation identification component 308 then identifies relation types between the one or more domain specific technical terms based on the one or more hypernyms determined for the respective one or more domain specific technical terms. In particular, the lexical database is used to provide a hypernym tree for each domain specific technical term. The words of the hypernym tree are then used by the inter concept relation identification component 308 to introduce a relation cis a subtype of between the corresponding word and the special node, such as 'action'. For example, a hypernym tree created for the word 'evaluation' and its derivationally related word 'evaluate' may contain synonym set with nodes, such as 'act', 'human action', or 'human activity'. In one example, the inter concept relation identification component 308 may identify 'Evaluate' is a subtype of 'ACTION'.

Additionally, the inter concept relation identification component 308 identifies attributes of relations between the one or more domain specific technical terms and one or more phrases providing information about the one or more domain specific technical terms using the one or more open information extraction algorithms, such as AllenNLP Open Information extraction algorithm and the one or more semantic role labelling algorithms, such as AllenNLP semantic role labelling algorithm. It should be noted that the open information extraction algorithms and the semantic role labelling algorithms can be any known algorithms available in the art.

The CG creation component 310 includes suitable logic and/or interfaces for creating a concept graph (CG) by populating a concept graph data structure using the one or more domain specific technical terms identified by the domain specific term identification component 306 and the additional information obtained corresponding to the technical domain by the inter concept relation identification component 308. An example of the CG created corresponding to a sentence 'DBSCAN and OPTICS defines clusters as connected dense regions in the data space' provided in text data associated with the technical domain 'cluster analysis is shown with reference to FIG. 6.

The KG interface component 312 includes suitable logic and/or interfaces for using the received pre-computed and curated knowledge graph focused on the text data associated with the technical domain in technical question generation process. An example of the pre-computed and curated knowledge graph received for the technical domain 'cluster analysis' is shown with reference to FIG. 7.

The graph motif identification component 314 includes suitable logic and/or interfaces for identifying one or more graph motifs in one or more graphs using linguistic information associated with one or more graph elements, such as one or more nodes and one or more edges connecting the one or more nodes of the corresponding one or more graphs. In general, graph motifs refer to patterns that are present in a graph. So, the graph motif identification component 314 uses the linguistic information associated with the nodes and edges (e.g., headword of a concept node in a CG, type of a relation node) of each graph to identify patterns i.e., graph motifs present in the respective graph. The one or more graphs includes KG, ULDG, DSG and CG. It should be noted that the graph motif identification component 314 obtains the linguistic information about the graph elements from the ULDG component 304. Examples of sample linguistic graph motifs is shown with reference to FIGS. 8A-8B.

In an embodiment, the graph motif identification component 314 combines information present in one or more graphs to identify patterns i.e., graph motifs based on the combined information of the one or more graphs. An example of a graph motif created based on combining a KG and a CG is shown with reference to FIG. 9.

The question generation component 316 includes suitable logic and/or interfaces for generating one or more technical questions based on the one or more graph motifs and the one or more graphs, such as KG, ULDG, DSG and CG using a plurality of semantic templates. In an embodiment, the one or more technical questions includes at least one of one or more descriptive type technical questions and one or more yes-no type technical questions. The yes-no type technical questions also include questions whose answers are 'No'. Examples of the semantic templates that can be used for technical question generation are shown with reference to FIGS. 10A and 10B.

For example, with reference to above mentioned examples, 'complete linkage clustering' and 'average linkage clustering' are identified as domain-specific concepts by the domain specific term identification component 306 for the technical domain 'cluster analysis'. Thus, the Concept Graph (CG) created for the same technical domain includes 'complete linkage clustering' and 'average linkage clustering' as nodes. Further, the inter concept relation identification component 308 identifies 'complete linkage clustering' and 'average linkage clustering' as subtypes of the 'clustering concept'. The semantic templates that may be used by the question generation component 316 for generating questions corresponding to the graph motif shown in FIG. 8A include 'What is the difference between Concept-A and Concept-B?' and 'Compare Concept-A and Concept-B.'. So, the technical questions that can be generated based on the example graph motif shown in FIG. 8A using the semantic templates may include 'What is the difference between complete linkage clustering and average linkage clustering?' and 'Compare complete linkage clustering and average linkage clustering'.

Figure 9:
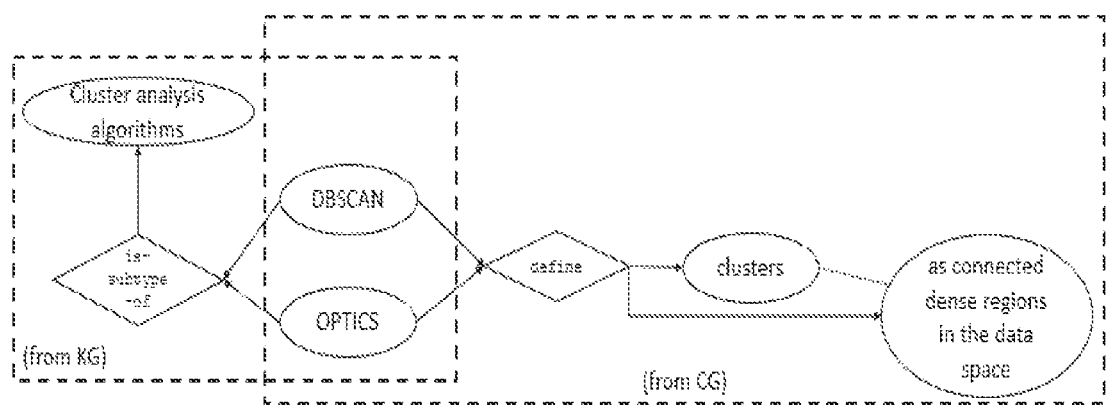
FIG. 9 illustrates an example representation of a graph motif created by combining a knowledge graph (KG) and a CG by the system of FIG. 2 or the TQGS of FIG. 1, in accordance with an embodiment of the present disclosure

In another example, technical questions that can be generated based on the graph motifs shown in FIG. 9 includes 'Which cluster analysis algorithms define clusters as connected dense regions in the data space?', 'Does CURE define clusters as connected dense regions in the data space? Justify (an example of question whose answer is 'no')', 'Does DBSCAN define clusters as connected dense regions in the data space? Justify', and 'Does OPTICS define clusters as connected dense regions in the data space? Justify'. Further, technical questions that can be generated based on the graph motif shown in FIG. 8B with the DSG shown in FIG. 5B includes 'How does one evaluate cluster analysis?', 'How to do internal evaluation of cluster analysis?', and 'How to do external evaluation of cluster analysis?'.

Figure 4:
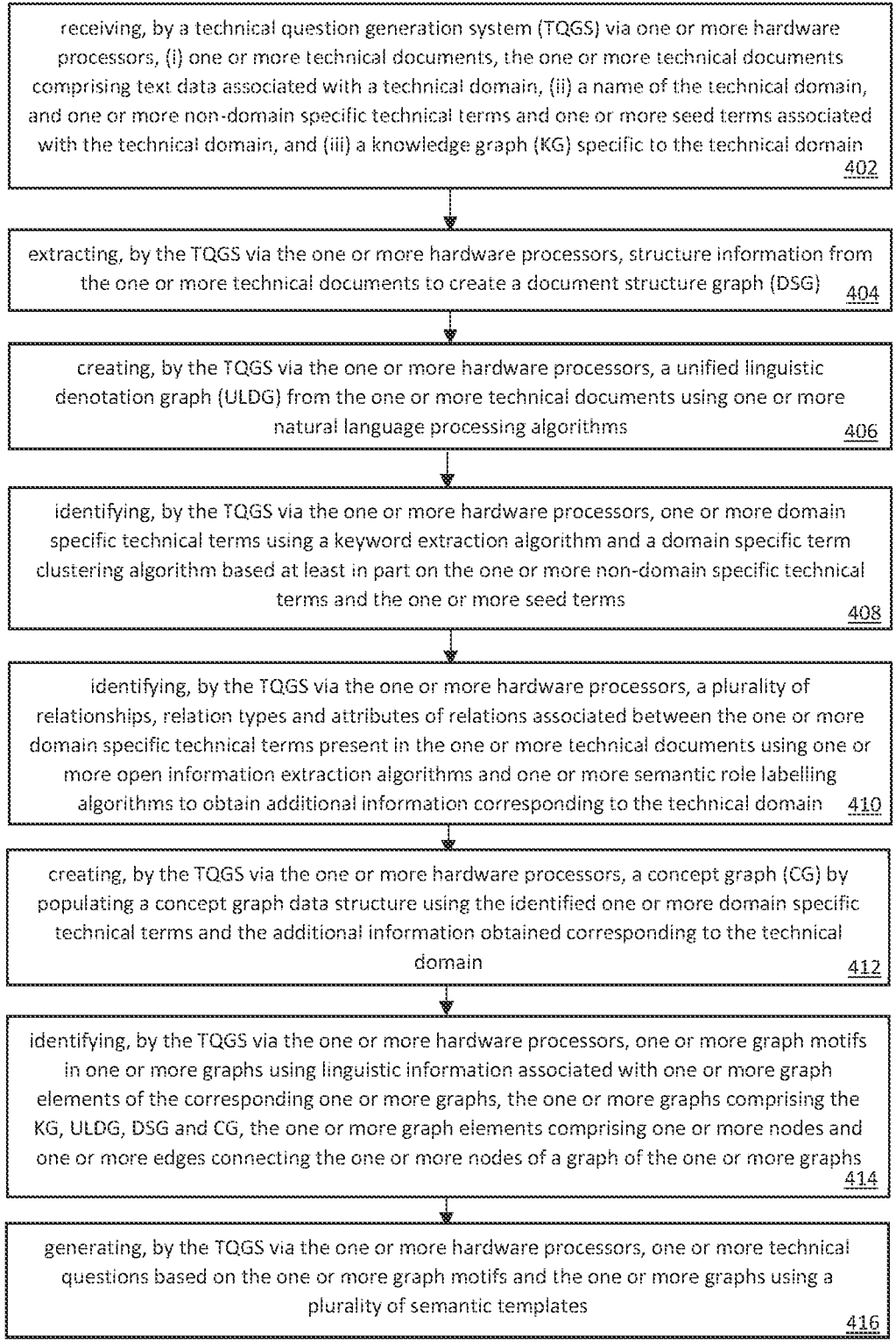
FIG. 4 illustrates an exemplary flow diagram of an automated method for generating technical questions from technical documents using the system of FIG. 2 or the TQGS of FIG. 1, in accordance with an embodiment of the present disclosure.
Figure 5B:
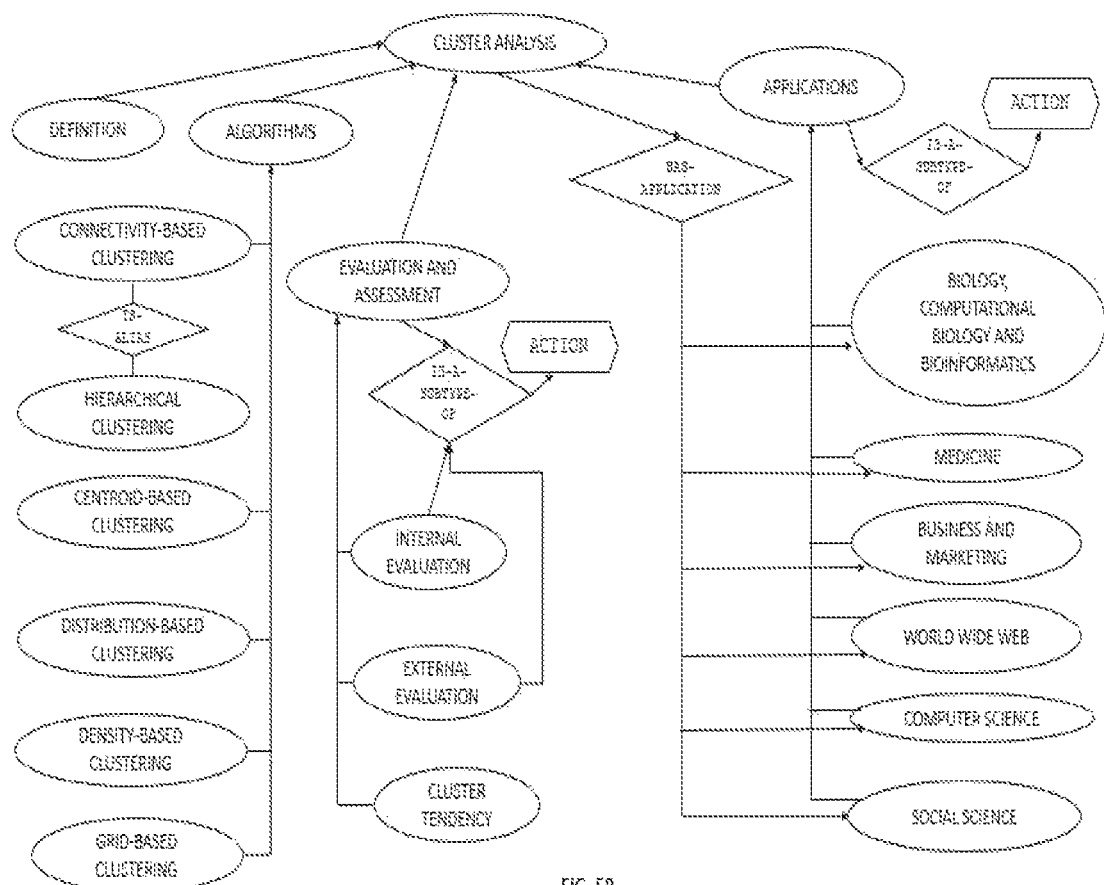
FIG. 5B illustrates an example representation of a document structure graph created corresponding to the structure information extracted in FIG. 5A, in accordance with an embodiment of the present disclosure.
Figure 6:
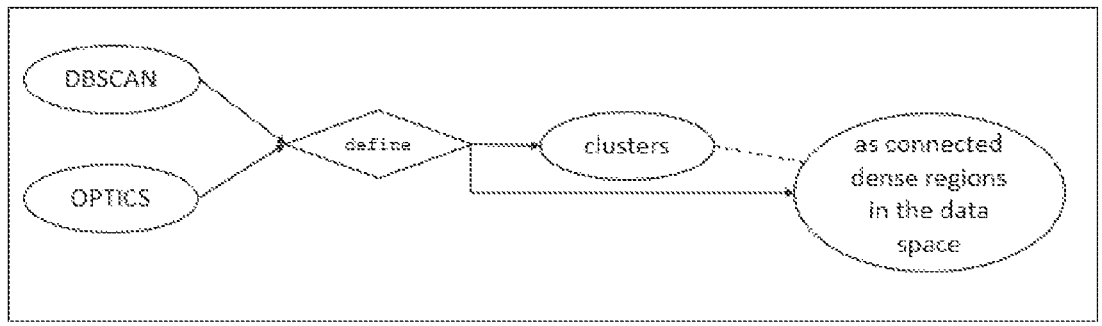
FIG. 6 illustrates an example representation of a concept graph (CG) created using the system of FIG. 2 or the TQGS of FIG. 1, in accordance with an embodiment of the present disclosure.
Figure 7:
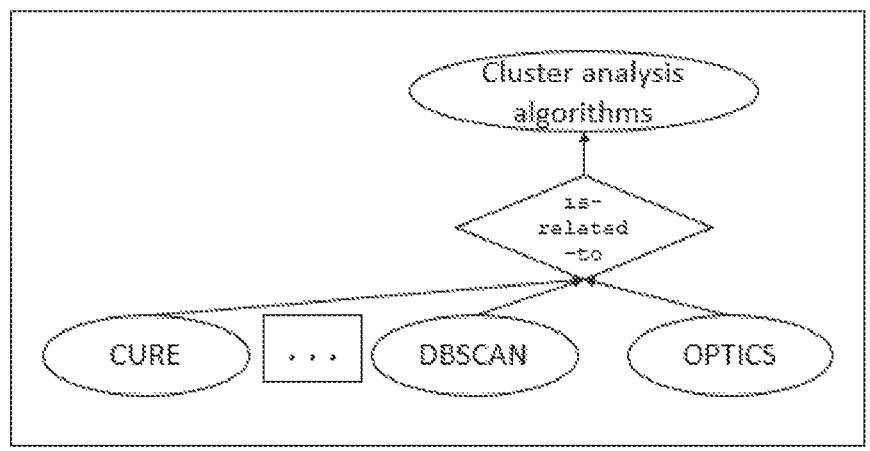
FIG. 7 illustrates an example representation of a pre-computed and curated knowledge graph received by the system of FIG. 2 or the TQGS of FIG. 1 for a technical domain, in accordance with an embodiment of the present disclosure.
Figure 8A:
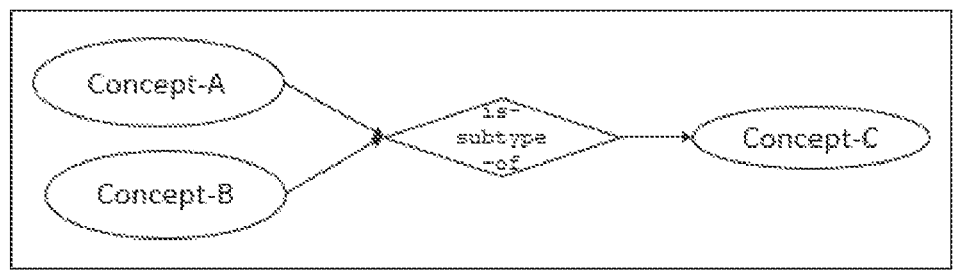
FIGS. 8A and 8B illustrate example representations of linguistic graph motifs identified by the system of FIG. 2 or the TQGS of FIG. 1, in accordance with an embodiment of the present disclosure.
Figure 8B:
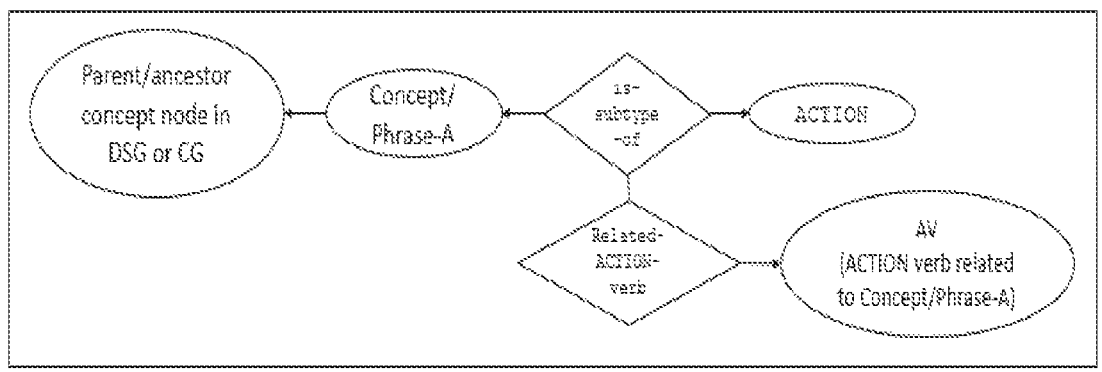

FIG. 4, with reference to FIGS. 1-3, illustrates an exemplary flow diagram 400 of an automated method for generating technical questions from technical documents using the system 200 of FIG. 2 or the TQGS 106 of FIG. 1, in accordance with an embodiment of the present disclosure. In an embodiment, the system(s) 200 comprises one or more data storage devices or the memory 208 operatively coupled to the one or more hardware processors 206 and is configured to store instructions for execution of steps of the method by the one or more hardware processors 206. The steps of the method of the present disclosure will now be explained with reference to the components of the system 200 as depicted in FIG. 2, and the TQGS 106 of FIG. 1.

In an embodiment of the present disclosure, at step 402, the one or more hardware processors 206 of the technical question generation system (TQGS) 200 receive (i) one or more technical documents, (ii) a name of the technical domain, and one or more non-domain specific technical terms and one or more seed terms associated with the technical domain, and (iii) a knowledge graph (KG) specific to the technical domain. The one or more technical documents includes text data associated with a technical domain.

In one embodiment, the technical documents can be in form of Wikipedia pages or chapters from books related to a technical skill, subject or domain.

In an embodiment, the one or more seed terms can be one or more related terms that are provided either at an end or in starting of books related to the technical skill. The user can directly use these related terms as the seed terms for initiating technical question generation by providing the seed terms as an input to the TQGS 200.

In an embodiment, a user (e.g., the user 104) may use subset of large knowledge graphs, such as DBPedia and WikiData to compute the knowledge graph specific to the technical domain by running one or more subgraph identification algorithms, such as CRUMBTRAIL on the large knowledge graphs. The subgraph identification algorithms use nodes corresponding to the technical domain as seed for creating the KG specific to the technical domain.

In an embodiment of the present disclosure, at step 404, the one or more hardware processors 206 of the technical question generation system (TQGS) 200 extract structure information from the one or more technical documents to create a document structure graph (DSG). In one embodiment, the structure information includes at least one of table of contents, titles of sections, subsections, hyperlinks, and text portions with special mark-up present in text data provided in the technical domain. Once the structure information is extracted, the hardware processors 206 use the extracted structure information to create the document structure graph.

At step 406 of the present disclosure, the one or more hardware processors 206 of the technical question generation system (TQGS) 200 creates a unified linguistic denotation graph (ULDG) from the one or more technical documents using one or more natural language processing algorithms. The above step 406 is better understood by way of following description.

As discussed previously, the one or more hardware processors 206 of the technical question generation system (TQGS) 200 perform sentence filtering on the one or more technical documents for marking and filtering sentences that contain named entities, time expressions etc., to create a filtered set of technical documents. Once the filtered set of technical documents is available, the one or more hardware processors 206 use the one or more natural language processing algorithms for assigning part-of-speech (POS) tags and lemmas to each word present in the filtered set of technical documents, for generating a dependency parse tree and a constituency parse tree for each sentence and for marking one or more co-references present in the filtered set of technical documents. In an embodiment, the part-of-speech (POS) tags, the lemmas, the dependency parse trees, the constituency parse trees, and the one or more co-references are part of the linguistic information associated with the text data provided in the one or more technical documents.

Further, the one or more hardware processors 206 of the technical question generation system (TQGS) 200 utilizes the linguistic information associated with the text data to create the ULDG for the technical domain.

At step 408 of the present disclosure, the one or more hardware processors 206 of the technical question generation system (TQGS) 200 identify one or more domain specific technical terms using a keyword extraction algorithm and a domain specific term clustering algorithm based at least in part on the one or more non-domain specific technical terms and the one or more seed terms. The process of identifying domain specific technical terms is explained in detail with reference to FIG. 3 and the description is not reiterated herein for the sake of brevity.

In an embodiment of the present disclosure, at step 410, the one or more hardware processors 206 of the TQGS 200 identify a plurality of relationships, relation types and attributes of relations associated between the one or more domain specific technical terms present in the one or more technical documents using one or more open information extraction algorithms and one or more semantic role labelling algorithms to obtain additional information corresponding to the technical domain. The process followed by the hardware processors 206 for identifying the plurality of relationships, relation types and attributes of relations associated between the one or more domain specific technical terms is explained in detail with reference to FIG. 3 and the description is not reiterated herein for the sake of brevity.

At step 412 of the present disclosure, the one or more hardware processors 206 of the TQGS 200 create a concept graph (CG) by populating a concept graph data structure using the identified one or more domain specific technical terms and the additional information obtained corresponding to the technical domain. The information obtained at step 408 and step 410 is merged by the hardware processors 206 to populate the concept graph data structure, thereby creating the CG. The CG further helps in identifying additional details about the technical domain.

In an embodiment of the present disclosure, at step 414, the one or more hardware processors 206 of the TQGS 200 identify one or more graph motifs in one or more graphs using linguistic information associated with one or more graph elements of the corresponding one or more graphs. In one embodiment, the one or more graphs includes the received KG and the created ULDG, DSG and CG. The one or more graph elements includes one or more nodes and one or more edges connecting the one or more nodes of a graph of the one or more graphs. The above step 414 is better understood by way of following description:

As discussed in step 406, the one or more hardware processors 206 identify the linguistic information associated with the text data and the one or more graphs are created based on the text data. So, the linguistic information associated with one or more graph elements of the corresponding one or more graphs is available to the one or more hardware processors 206 that further utilize the available linguistic information to identify patterns i.e., the graph motifs present in the one or more graphs, such as the KG, ULDG, DSG and CG.

In an embodiment, the one or more hardware processors 206 perform a comparison of each identified graph motif with at least one graph of the one or more graphs. In particular, the one or more hardware processors 206 perform a matching between the identified graph motif and the at least one graph. The one or more hardware processors 206 then identifies the one or more graph motifs for technical question generation based on the comparison. Once a match between the at least one graph and the identified graph motif is found, the same graph motif is identified by the one or more hardware processors 206 for technical question generation.

At step 416 of the present disclosure, the one or more hardware processors 206 of the TQGS 200 generate one or more technical questions based on the one or more graph motifs and the one or more graphs using a plurality of semantic templates. The one or more technical questions that are generated includes at least one of one or more descriptive type technical questions and one or more yes-no type technical questions. In an embodiment, the one or more descriptive type technical questions includes technical questions whose answers may span around 1 to 5 sentences. The one or more yes-no type technical questions includes technical questions for which the answer is 'no'.

In one embodiment, the one or more hardware processors 206 identify acceptable technical questions among the generated one or more technical questions using a trained classifier. The trained classifier classifies each technical question of the one or more technical questions either as an acceptable technical question or an unacceptable technical question and thus generates a list of acceptable questions. In an embodiment, the one or more hardware processors 206 stores the list of acceptable technical questions in a database, such as the database 204, and displays the list of acceptable technical questions to a user, such as the user 104 on a user device (e.g., the user device 102).

Further, the one or more hardware processors 206 use the list of acceptable questions for fine-tuning one or more pre-existing machine learning models and one or more pre-existing deep learning models for question generation.

As mentioned above, question generation from technical text is a challenging problem. The challenges associated with the technical question generation include elimination of the sentences from the technical text from whom the questions are not needed, answer un-aware question generation, long answer question generation, yes-no type question generation with 'no' as an answer etc. One of the known deep learning (DL) based technique for question generation is focused on generating questions from general purpose text but not on technical text. Further, the available techniques use general purpose datasets, such as SQUAD for training DL models for question generation. However, there are no readily available datasets that focuses on technical question generation. Additional limitations of the available techniques include question generation whose answers span a few words, high reliability on named entities, such as person, organization, and location etc., generation of questions that make no sense in technical domain, and inability to generate questions with 'no' as an answer. Embodiments of the present disclosure provide automated systems and methods that generate technical questions from technical documents. More specifically, structure information and linguistic information of the technical documents is extracted and technical questions involving technical terms not detected by named entity recognition (NER) techniques are generated using the extracted structure information and linguistic information. The method does not need the answers during the question generation process and follows an unsupervised learning paradigm for question generation, thereby eliminating the need of labelled training data including tuples of input sentence, an answer-phrase and a corresponding question that is usually required in existing techniques. The method generates questions relevant to a specific technical skill by making use of a curated knowledge graph and a concept graph. The systems and methods disclosed in the present disclosure ensures that the questions that are generated work well on technical text, thereby ensuring improved quality of the generated technical questions. Further, the technical questions generated using the systems and methods can act/serve as a dataset for fine-tuning other existing DL or machine learning (ML) based question generation systems.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a technical question generation system (TQGS) via one or more hardware processors, (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain;

extracting, by the TQGS via the one or more hardware processors, structure information from the one or more technical documents to create a document structure graph (DSG);

creating, by the TQGS via the one or more hardware processors, a unified linguistic denotation graph (ULDG) from the one or more technical documents using one or more natural language processing algorithms;

identifying, by the TQGS via the one or more hardware processors, one or more domain specific technical terms using a keyword extraction algorithm and a domain specific term clustering algorithm based at least in part on the one or more non-domain specific technical terms and the one or more seed terms;

identifying, by the TQGS via the one or more hardware processors, a plurality of relationships, relation types and attributes of relations associated between the one or more domain specific technical terms present in the one or more technical documents using one or more open information extraction algorithms and one or more semantic role labelling algorithms to obtain additional information corresponding to the technical domain;

creating, by the TQGS via the one or more hardware processors, a concept graph (CG) by populating a concept graph data structure using the identified one or more domain specific technical terms and the additional information obtained corresponding to the technical domain;

identifying, by the TQGS via the one or more hardware processors, one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generating, by the TQGS via the one or more hardware processors, one or more technical questions based on the one or more graph motifs and the one or more graphs using a plurality of semantic templates.

2. The processor implemented method of claim 1, wherein the one or more technical questions comprise at least one of one or more descriptive type technical questions and one or more yes-no type technical questions.

3. The processor implemented method of claim 1, wherein the step of creating, by the TQGS via the one or more hardware processors, the ULDG from the one or more technical documents using the natural language processing algorithm is preceded by:

identifying, by the TQGS via the one or more hardware processors, one or more named entities and one or more time expressions present in the one or more technical documents using the one or more natural language processing algorithms, wherein the one or more natural language processing algorithms assign a named entity tag to each named entity and a time expression tag to each time expression present in the one or more technical documents; and performing, by the TQGS via the one or more hardware processors, a sentence filtering on the one or more technical documents based on the named entity tags and the time expression tags present in the one or more technical documents to obtain a filtered set of technical documents.

4. The processor implemented method of claim 3, wherein the step of creating, by the TQGS via the one or more hardware processors, the ULDG from the one or more technical documents using one or more natural language processing algorithms comprises:

assigning, by the TQGS via the one or more hardware processors, part-of-speech (POS) tags and lemmas to each word present in the filtered set of technical documents using the one or more natural language processing algorithms;

generating, by the TQGS via the one or more hardware processors, a dependency parse tree and a constituency parse tree for each sentence present in the filtered set of technical documents using the one or more natural language processing algorithms;

marking, by the TQGS via the one or more hardware processors, one or more co-references present in the filtered set of technical documents using the one or more natural language processing algorithms;

identifying, by the TQGS via the one or more hardware processors, the part-of-speech (POS) tags, the lemmas, the dependency parse trees, the constituency parse trees and the one or more co-references as linguistic information associated with the text data provided in the one or more technical documents; and creating, by the TQGS via the one or more hardware processors, the ULDG based on the identified linguistic information.

5. The processor implemented method of claim 4, wherein the step of identifying, by the TQGS via the one or more hardware processors, the one or more domain specific technical terms present in the one or more technical documents using the keyword extraction algorithm and the domain specific term clustering algorithm based at least in part on the one or more non-domain specific technical terms and the one or more seed terms comprises:

extracting, by the TQGS via the one or more hardware processors, one or more technical terms from the text data present in the filtered set of technical documents based on the technical domain using the keyword extraction algorithm;

extracting, by the TQGS via the one or more hardware processors, one or more keywords present in at least one of indices, table of contents, anchor text of hyperlinks and title of hyperlinks present in the filtered set of technical documents;

extracting, by the TQGS via the one or more hardware processors, one or more noun phrases present in the filtered set of technical documents;

identifying, by the TQGS via the one or more hardware processors, the extracted one or more technical terms, the one or more keywords and the one or more noun phrases as one or more candidate domain specific technical terms; and segregating, by the TQGS via the one or more hardware processors, the one or more domain specific technical terms in the filtered set of technical documents based on the identified one or more candidate domain specific technical terms and the received one or more non-domain specific technical terms and the one or more seed terms using the domain specific term clustering algorithm.

6. The processor implemented method of claim 5, wherein the step of identifying, by the TQGS via the one or more hardware processors, the plurality of relationships, relation types and attributes of relations associated between the one or more domain specific technical terms using the one or more open information extraction algorithms and the one or more semantic role labelling algorithms to obtain additional information about the technical domain comprises:
  accessing, by the TQGS via the one or more hardware processors, a phrase structure of words available for each domain specific technical term of the one or more domain specific technical terms, wherein the phrase structure of words for each domain specific technical term is created based on a dependency parse tree created for the respective domain specific technical terms;
  accessing, by the TQGS via the one or more hardware processors, one or more words that are in vicinity of the one or more domain specific technical terms;
  identifying, by the TQGS via the one or more hardware processors, is-a-subtype-of relationships among words of one or more domain specific technical terms based on the phrase structure of the respective one or more domain specific technical terms;
  identifying, by the TQGS via the one or more hardware processors, hypernymy-hyponymy relationships among the one or more domain specific technical terms based on the one or more words that are in vicinity of the respective one or more domain specific technical terms and the phrase structures of the respective one or more domain specific technical terms;
  determining, by the TQGS via the one or more hardware processors, one or more hypernyms for each domain specific technical term of the one or more domain specific technical terms using a lexical database;
  identifying, by the TQGS via the one or more hardware processors, the relation types between the one or more domain specific technical terms based on the one or more hypernyms determined for the respective one or more domain specific technical terms;
  identifying, by the TQGS via the one or more hardware processors, attributes of relations between the one or more domain specific technical terms and one or more phrases providing information about the one or more domain specific technical terms using the one or more open information extraction algorithms and the one or more semantic role labelling algorithms; and
  identifying, by the TQGS via the one or more hardware processors, the identified is-a-subtype-of relationships, hypernymy-hyponymy relationships, the relation types, the attributes of relation and the one or more phrases as the additional information about the technical domain.

7. The processor implemented method of claim 1, wherein the step of identifying, by the TQGS via the one or more hardware processors, one or more graph motifs in the one or more graphs using linguistic information associated with one or more graph elements of the one or more graphs comprises:
  performing, by the TQGS via the one or more hardware processors, a comparison of each graph motif with at least one graph of the one or more graphs; and
  identifying, by the TQGS via the one or more hardware processors, the one or more graph motifs for technical question generation based on the comparison.

8. The processor implemented method of claim 1, further comprising:
  classifying, by the TQGS via the one or more hardware processors, each technical question of the one or more technical questions either as an acceptable technical question or an unacceptable technical question using a trained question classifier to generate a list of acceptable technical questions;
  upon completion of the classification of the one or more technical questions, storing, by the TQGS via the one or more hardware processors, the list of acceptable technical questions in a database; and
  displaying, by the TQGS via the one or more hardware processors, the list of acceptable technical questions.

9. The processor implemented method of claim 8, further comprising:
  fine-tuning, by the TQGS via the one or more hardware processors, one or more pre-existing machine learning models and one or more pre-existing deep learning models for question generation using the list of acceptable questions.

10. A technical question generation system (TQGS), comprising:
  a memory storing instructions;
  one or more communication interfaces; and
  one or more hardware processors coupled to the memory via the one or more communication interfaces, wherein the one or more hardware processors are configured by the instructions to:
  receive (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain;
  extract structure information from the one or more technical documents to create a document structure graph (DSG);
  create a unified linguistic denotation graph (ULDG) from the one or more technical documents using one or more natural language processing algorithms;
  identify one or more domain specific technical terms using a keyword extraction algorithm and a domain specific term clustering algorithm based at least in part on the one or more non-domain specific technical terms and the one or more seed terms;
  identify a plurality of relationships, relation types and attributes of relations associated between the one or more domain specific technical terms present in the one or more technical documents using one or more open information extraction algorithms and one or more semantic role labelling algorithms to obtain additional information corresponding to the technical domain;
  create a concept graph (CG) by populating a concept graph data structure using the identified one or more domain specific technical terms and the additional information obtained corresponding to the technical domain;
  identify one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generate one or more technical questions based on the one or more graph motifs and the one or more graphs using a plurality of semantic templates.

11. The system as claimed in claim 10, wherein the one or more technical questions comprise at least one of one or more descriptive type technical questions and one or more yes-no type technical questions.

12. The system as claimed in claim 10, wherein the step of creating, by the TQGS via the one or more hardware processors, the ULDG from the one or more technical documents using the natural language processing algorithm is preceded by:
   identifying one or more named entities and one or more time expressions present in the one or more technical documents using the one or more natural language processing algorithms, wherein the one or more natural language processing algorithms assign a named entity tag to each named entity and a time expression tag to each time expression present in the one or more technical documents; and
   performing a sentence filtering on the one or more technical documents based on the named entity tags and the time expression tags present in the one or more technical documents to obtain a filtered set of technical documents.

13. The system as claimed in claim 12, wherein the step of creating the ULDG from the one or more technical documents using one or more natural language processing algorithms comprises:
   assigning part-of-speech (POS) tags and lemmas to each word present in the filtered set of technical documents using the one or more natural language processing algorithms;
   generating a dependency parse tree and a constituency parse tree for each sentence present in the filtered set of technical documents using the one or more natural language processing algorithms;
   marking one or more co-references present in the filtered set of technical documents using the one or more natural language processing algorithms;
   identifying the part-of-speech (POS) tags, the lemmas, the dependency parse trees, the constituency parse trees and the one or more co-references as linguistic information associated with the text data provided in the one or more technical documents; and
   creating the ULDG based on the identified linguistic information.

14. The system as claimed in claim 13, wherein the step of identifying the one or more domain specific technical terms present in the one or more technical documents using the keyword extraction algorithm and the domain specific term clustering algorithm based at least in part on the one or more non-domain specific technical terms and the one or more seed terms comprises:
   extracting one or more technical terms from the text data present in the filtered set of technical documents based on the technical domain using the keyword extraction algorithm;
   extracting one or more keywords present in at least one of indices, table of contents, anchor text of hyperlinks and title of hyperlinks present in the filtered set of technical documents;
   extracting one or more noun phrases present in the filtered set of technical documents;
   identifying the extracted one or more technical terms, the one or more keywords and the one or more noun phrases as one or more candidate domain specific technical terms; and
   segregating the one or more domain specific technical terms in the filtered set of technical documents based on the identified one or more candidate domain specific technical terms and the received one or more non-domain specific technical terms and the one or more seed terms using the domain specific term clustering algorithm.

15. The system as claimed in claim 14, wherein the step of identifying the plurality of relationships, relation types and attributes of relations associated between the one or more domain specific technical terms using the one or more open information extraction algorithms and the one or more semantic role labelling algorithms to obtain additional information about the technical domain comprises:
   accessing a phrase structure of words available for each domain specific technical term of the one or more domain specific technical terms, wherein the phrase structure of words for each domain specific technical term is created based on a dependency parse tree created for the respective domain specific technical terms;
   accessing one or more words that are in vicinity of the one or more domain specific technical terms;
   identifying is-a-subtype-of relationships among words of one or more domain specific technical terms based on the phrase structure of the respective one or more domain specific technical terms;
   identifying hypernymy-hyponymy relationships among the one or more domain specific technical terms based on the one or more words that are in vicinity of the respective one or more domain specific technical terms and the phrase structures of the respective one or more domain specific technical terms;
   determining one or more hypernyms for each domain specific technical term of the one or more domain specific technical terms using a lexical database;
   identifying the relation types between the one or more domain specific technical terms based on the one or more hypernyms determined for the respective one or more domain specific technical terms;
   identifying attributes of relations between the one or more domain specific technical terms and one or more phrases providing information about the one or more domain specific technical terms using the one or more open information extraction algorithms and the one or more semantic role labelling algorithms; and
   identifying the identified is-a-subtype-of relationships, hypernymy-hyponymy relationships, the relation types, the attributes of relation and the one or more phrases as the additional information about the technical domain.

16. The system as claimed in claim 10, wherein the step of identifying one or more graph motifs in the one or more graphs using linguistic information associated with one or more graph elements of the one or more graphs further comprises:
   performing a comparison of each graph motif with at least one graph of the one or more graphs; and
   identifying the one or more graph motifs for technical question generation based on the comparison.

17. The system as claimed in claim 10, wherein the one or more hardware processors are configured by the instructions to:

classify each technical question of the one or more technical questions either as an acceptable technical question or an unacceptable technical question using a trained question classifier to generate a list of acceptable technical questions;

upon completion of the classification of the one or more technical questions, store the list of acceptable technical questions in a database; and display the list of acceptable technical questions.

18. The system as claimed in claim 17, wherein the one or more hardware processors are configured by the instructions to:

fine-tune one or more pre-existing machine learning models and one or more pre-existing deep learning models for question generation using the list of acceptable questions.

19. One or more non-transitory machine-readable information storage mediums comprising one or more instructions which when executed by one or more hardware processors cause:

receiving, by a technical question generation system (TQGS) (i) one or more technical documents, the one or more technical documents comprising text data associated with a technical domain, (ii) a name of the technical domain, and one or more non-domain specific technical terms and one or more seed terms associated with the technical domain, and (iii) a knowledge graph (KG) specific to the technical domain;

extracting, by the TQGS, structure information from the one or more technical documents to create a document structure graph (DSG);

creating, by the TQGS, a unified linguistic denotation graph (ULDG) from the one or more technical documents using one or more natural language processing algorithms;

identifying, by the TQGS, one or more domain specific technical terms using a keyword extraction algorithm and a domain specific term clustering algorithm based at least in part on the one or more non-domain specific technical terms and the one or more seed terms;

identifying, by the TQGS, a plurality of relationships, relation types and attributes of relations associated between the one or more domain specific technical terms present in the one or more technical documents using one or more open information extraction algorithms and one or more semantic role labelling algorithms to obtain additional information corresponding to the technical domain;

creating, by the TQGS, a concept graph (CG) by populating a concept graph data structure using the identified one or more domain specific technical terms and the additional information obtained corresponding to the technical domain;

identifying, by the TQGS, one or more graph motifs in one or more graphs using linguistic information associated with one or more graph elements of the corresponding one or more graphs, the one or more graphs comprising the KG, ULDG, DSG and CG, the one or more graph elements comprising one or more nodes and one or more edges connecting the one or more nodes of a graph of the one or more graphs; and generating, by the TQGS, one or more technical questions based on the one or more graph motifs and the one or more graphs using a plurality of semantic templates.

20. The one or more non-transitory machine-readable information storage mediums of claim 19, wherein the one or more technical questions comprise at least one of one or more descriptive type technical questions and one or more yes-no type technical questions.

* * * * *